May 24, 1932. F. CZAPAR, JR 1,859,655
DEVICE FOR FEEDING GRANULAR MATERIAL
Filed Sept. 2, 1931

INVENTOR
FRANK CZAPAR JR
BY
ATTORNEY

Patented May 24, 1932

1,859,655

UNITED STATES PATENT OFFICE

FRANK CZAPAR, JR., OF SAN DIEGO, CALIFORNIA

DEVICE FOR FEEDING GRANULAR MATERIAL

Application filed September 2, 1931. Serial No. 560,777

This invention relates to devices for breaking up and disassociating grains of granular material which through moisture or other causes may have become massed together, by agitating the same, and its object is to provide a novel form of dasher or agitator whereby a quick and thorough sifting is effected and which is constructed to be manually oscillated or reciprocated when occasion requires to overcome the adhesion of the conglomerated mass, the same being adapted for use principally in combination with a sugar bowl and especially at a time when a serving of sugar is desired.

Present day sugar containers used on lunch counters and in restaurants are constructed in such a manner that it is essential to invert them and allow the fine grains of sugar to run through an orifice. Sometimes sugar is allowed to run directly into the cup, other times the operator may desire to measure the outflowing sugar with a spoon.

These orifices through which the sugar flows are usually left open, thus subjecting the contents to the outside air the moisture of which causes the fine grains to adhere together.

Consequently when this condition arises and the sugar container is inverted, the sugar will not flow. It may lump or collect around the orifice sufficiently to cause a customer much annoyance and disgust.

It is therefore a principal object of this invention to eradicate this condition as well as to aid in maintaining a sanitary condition of the contents stored within the container.

Other and auxiliary objects may also hereinafter appear.

In order that the invention may be properly understood, reference is had to the accompanying drawings in which six views are shown; Figures 1 and 2 being a preferred embodiment of the invention and Figures 3, 4, 5 and 6 being alternate specie generally relating to the same.

Figures 1, 2, 3, 4, 5, 6:
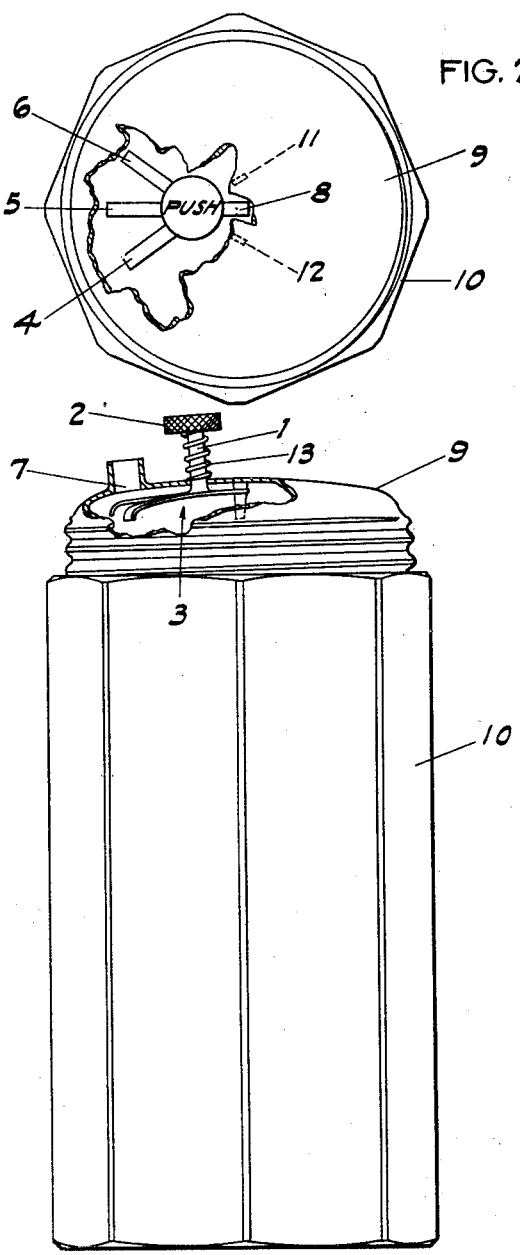
Fig. 1 is a side elevation of the invention as applied to a sugar jar cap, parts of the cap being broken away to illustrate the application of the device.
Fig. 2 is a plan view of the device as applied to a sugar jar cap, some parts of which again are broken away to show interior construction.
Fig. 3 and Fig. 5 are side and part sectional elevations of the device showing alternative applications of the device to a sugar jar cap.
Fig. 4 is a fragmentary plan view of the agitator or dash shown in Fig. 3.
Fig. 6 is a fragmentary perspective view of the agitator or dash shown in Fig. 5.

The present invention is disclosed for use in combination or conjunction with a sugar jar.

More specifically the invention comprises an agitator or dasher the construction of which will be hereinafter referred to as somewhat simulating a crow's foot and consists of a key portion comprising a shank or shaft 1, a knurled head 2, and the crow's foot proper 3.

The crow's foot 3 has three toes 4, 5 and 6 which due to the proper juxtapositioning of the shaft 1 with relation to the aperture 7 underlie the apertured portion of the cap.

There is a rear toe 8 diametrically opposite the middle toe 5. On the inside of the lid 9 which serves as a cap for the jar 10 are cast or otherwise formed two prongs 11 and 12 between which the rear toe 8 plays, to limit the swing of the toes 4 and 6.

The prongs 11 and 12 are made preferably pointed and are sufficiently long to insure that even when the head 2 is completely depressed the toe 8 will still be confined to its limited swing.

The crow's foot proper may be made out of spring steel and contoured to the inner surface of the cap so that when the crow's foot is moved laterally the toes thereof will sweep over the aperture 7 to remove any particles collected or adhered thereto. By repeatedly manually depressing the dasher the sugar particles are churned until they become finely divided.

The toes 4, 5 and 6 are curved at their ends to simulate the claws of a crow's foot. As the crow's foot is reciprocated or swung when the jar is inverted and the sugar mass comes into contact therewith, the disintegrating function of the crow's foot and resulting prevention of clogging will be effected.

Between the top of the cap 9 and the bottom of the head 2 is wound about the shaft 1 a spiral spring 13, which is so tensioned that the crow's foot will sweep along the inside portion of the cap.

This relation of the crow's foot to the inside surface of the cap may be varied to suit the different grades of sugar used.

The crow's foot 3 may be so positioned that the toes 4 and 5 or 5 and 6 may lie at either side of the aperture 7 or they may be made sufficiently fine that when one of them underlies the aperture 7 it will perform a separating action of the adhered particles whereby they will easily sift through the opening.

Although I preferably use two prongs 11 and 12 to limit the swing of the toes 4 and 6, it is apparent that should the prongs be dispensed with entirely the crow's foot could make a complete revolution about the axis of the shaft owing to the resiliency of the toes of the crow's foot which would still adapt themselves to the curvature of the inner surface of the cap.

This feature is further augmented by the yielding nature of the spring 13.

The functioning of the crow's foot will now be described with particular reference to the specie shown in Figures 3, 4, 5 and 6.

In Fig. 3, manually compressing the spring 14 advances the crow's foot, and in Fig. 5 manually depressing the head 15 retracts the crow's foot. In the first instance the aperture 7 is normally open, in the second instance the aperture is normally closed. Closing the aperture keeps the moisture from affecting the sugar. In each instance, however, by reciprocating the crow's foot the breaking up of the sugar mass is effected.

To effect this reciprocation in each case I employ the use of a bell crank lever 16 pivoted to a lug 17 depending from the inside surface of the lid 9.

The head 15 is connected to a shaft 18 journalled in a boss 19 in the cap 9. To said shaft 18 and an arm of the bell crank lever 16 is pivotally joined the intermediate link 20.

To the outer extremity of the other arm of the bell crank lever is pivotally fastened either of the crow's feet 21 and 22. The construction of the crow's foot in the specie of Figs. 3 and 5 is somewhat different. One is somewhat curved and the other is straight. Each crow's foot, however, has its central prong 23 slidingly supported within a slot 24 formed within one of the extended sides 25 of the spout 7a.

To the crow's foot 21 at either side thereof is riveted the toes 26 and 27. The same construction is carried out in the crow's foot 22 except the toes are sharp and pointed whereby a more convenient agitation of the sugar is effected. In the crow's foot 22 the central prong 23 has a subjacent toe 28 and overlying said toe whereby to close the aperture 7 is attached the cover plate 29.

In both alternative specie manually depressing the head 15 operates the bell crank lever to reciprocate the crow's foot to advance or retract the same to accomplish the purposes set forth and now claimed.

I claim:

1. In combination, a receptacle, a lid closure therefor provided with an orifice through which the contents of said receptacle is expelled, an agitator simulating a crow foot juxtaposed therewith, means whereby said crow foot may be reciprocated to agitate the contents of said receptacle as they are expelled therefrom, means whereby said crow foot may be oscillated to sweep over said orifice to wipe therefrom particles adhered thereto, and means to limit the oscillative travel of said crow foot.

2. In a device of the class described, a lid, an aperture in said lid, an agitating device juxtaposed therewith comprising a crow foot, means whereby said crow foot may be manually shifted to sweep over said aperture, and yielding means tending to hold said crow foot in sweeping position.

3. In a device of the class described, a lid, an aperture in said lid, an agitating device juxtaposed therewith comprising a crow foot, means whereby said crow foot may be manually shifted to sweep over said aperture, yielding means tending to hold said crow foot in sweeping position, and means to limit the sweeping travel of said crow foot.

4. In a device of the class described, a lid provided with an aperture, a dasher juxtapositioned therewith comprising a shank extending through said lid, a plurality of prongs emanating therefrom adapted to sweep over said aperture when said shank is manually operated to and from a position on each side of said aperture, means to limit the angle of twist, and yieldable means tending to hold said prongs in a sweeping position.

5. In a device of the class described, a closure member for a sugar jar including an orifice through which the sugar in said jar is expelled, agitating means adjacent said orifice whereby as the contents of said jar are dispensed the particles composing the contents are broken up and disassociated, means whereby said agitating means may be shifted to sweep over said orifice to wipe therefrom particles adhered thereto, said means including a crow foot and yielding means to automatically retract said crow foot after it has been manually depressed to agitate the contents of said jar.

6. In a device of the kind described, a container having a discharge aperture, a key projecting through and being depressible in an opening in spaced relation to said discharge aperture, yieldable means interposed between the head of said key and the wall of said container whereby to retract the key, and a pivoted toe member pivotally secured to said key within the receptacle and operable by said key to sweep back and forth beneath said discharge aperture to wipe therefrom particles adhered thereto and thereby prevent clogging of materials fed therethrough.

7. In a device of the kind described, a container having a lid with a discharge aperture, a key projecting through said lid and being depressible in an opening in spaced relation to said discharge aperture within the confines of said lid, yieldable means interposed between the head of said key and said lid, whereby to retract the key, and an agitator pivotally within said lid adjacent to said aperture, said agitator being pivoted to said key whereby to sweep over and keep said aperture free of particles which tend to adhere thereto.

8. In a device of the kind described, a container having a discharge aperture, a key projecting through and being depressible in an opening in spaced relation to said discharge aperture, a spring interposed between the head of said key and the wall of said container tending to hold said key in an extended position, said key being manually depressible against the opposition of said spring, and an agitator within the receptacle pivoted to said key and having its free end movable within the opening of said discharge aperture whereby to keep said aperture clean and simultaneously agitate the contents of the container as they are expelled thru said aperture.

9. In a device of the kind described, a container having a discharge aperture, a depressible key extending through the wall of said container in spaced relation to said discharge aperture, yieldable means interposed between the head of said key and the wall of said container, and an agitating element pivoted to said key and pivotally fulcrumed to said container operable thereby to agitate material within said receptacle adjacent to said discharge aperture as it is expelled therefrom, said agitating element being normally positioned outside of the contents contained in said container.

10. In a device of the kind described, a container having a discharge aperture, a turnable key extending through the wall of said container in spaced relation to said discharge aperture, an agitator carried by said key and oscillatable by turning movements thereof, said agitator having a stop arm, and projections carried by said container to cooperate with said stop arm.

11. In a device of the kind described, a container having a discharge aperture, a turnable key extending through the wall of said container in spaced relation to said discharge aperture, an agitator carried by said key and oscillatable by turning movements thereof, said agitator having a stop arm, and projections carried by said container to cooperate with said stop arm, said agitator comprising a plurality of arms which radiate from a common center that is in substantial alignment with said key.

12. In a device of the kind described, a receptacle having a discharge aperture, an agitator within said receptacle adapted to loosen granular material adjacent to said aperture and to sweep thereacross whereby to free said aperture of adhering particles, a guide for slidingly supporting said agitator, a manually operable key projecting through the wall of said receptacle, yieldable means interposed between the head of said key and the wall of said receptacle, a bell-crank connection between said key and agitator, and means to pivotally support the bell-crank.

13. In a device of the kind described, a receptacle having a discharge aperture, an agitator within said receptacle adapted to loosen granular material adjacent to said aperture and to sweep thereacross whereby to free said aperture of adhering particles, a guide for slidingly supporting said agitator, a manually depressible key projecting through the wall of said receptacle, yieldable means interposed between the head of said key and the wall of said receptacle, to restore said key to normal position after depression, a bell-crank connection between said key and agitator, and means to pivotally support the bell-crank.

FRANK CZAPAR, Jr.